United States Patent
Daniel

(10) Patent No.: US 8,782,266 B2
(45) Date of Patent: Jul. 15, 2014

(54) AUTO-DETECTION AND SELECTION OF AN OPTIMAL STORAGE VIRTUALIZATION PROTOCOL

(76) Inventor: David A. Daniel, Scottsdale, AZ (US)

( * ) Notice: Subject to any disclaimer, the term of this patent is extended or adjusted under 35 U.S.C. 154(b) by 722 days.

(21) Appl. No.: 12/653,805

(22) Filed: Dec. 18, 2009

(65) Prior Publication Data

US 2010/0161768 A1    Jun. 24, 2010

Related U.S. Application Data

(60) Provisional application No. 61/203,619, filed on Dec. 24, 2008.

(51) Int. Cl.

| | |
|---|---|
| *G06F 15/16* | (2006.01) |
| *G06F 15/177* | (2006.01) |
| *H04L 29/08* | (2006.01) |
| *G06F 13/38* | (2006.01) |
| *G06F 3/06* | (2006.01) |

(52) U.S. Cl.
CPC .......... *H04L 67/1097* (2013.01); *G06F 13/387* (2013.01); *G06F 3/0601* (2013.01); *G06F 2213/0036* (2013.01); *G06F 3/0604* (2013.01); *H04L 29/08549* (2013.01)
USPC .......................................... 709/230; 709/220

(58) Field of Classification Search
CPC .................... H04L 29/08549; H04L 67/1097; G06F 3/0601; G06F 3/0604; G06F 13/387; G06F 2213/0036
USPC .................................. 709/220, 223, 224, 230
See application file for complete search history.

(56) References Cited

U.S. PATENT DOCUMENTS

| | | | |
|---|---|---|---|
| 7,895,348 B2* | 2/2011 | Twitchell, Jr. ................ 709/230 |
| 2007/0043860 A1* | 2/2007 | Pabari ........................... 709/224 |
| 2008/0288941 A1* | 11/2008 | Adams et al. .................... 718/1 |
| 2010/0082700 A1* | 4/2010 | Parab ............................ 707/803 |

* cited by examiner

*Primary Examiner* — Brian J Gillis
(74) *Attorney, Agent, or Firm* — Robert C. Klinger

(57) ABSTRACT

A means for automatic detection and selection of an optimal network storage virtualization protocol. The invention is a solution for the problem of complexity and the resulting lack of optimization in storage virtualization implementations. The invention shields the user from the complexity of network analysis and allows the engaging of multiple storage virtualization protocols—as opposed to a single protocol. The invention enables automatic detection and selection of an optimal network storage virtualization protocol on a per resource basis, which is a unique capability and something that has not been accomplished in the prior art. The net result is a simplified user experience and optimized performance when using virtualized storage.

16 Claims, 7 Drawing Sheets

FIG. 2

| HOST IDs (IP Address) | STORAGE AVAILABLE TO HOSTS | | |
|---|---|---|---|
| | IP ADDRESS OF STORAGE RESOURCE | POSSIBLE PROTOCOLS TO ACCESS STORAGE RESOURCE | SELECTED OPTIMAL PROTOCOL TO ACCESS STORAGE RESOURCE |
| 192.168.0.4 | 192.168.0.4 | SCSI over i-PCI HyperSCSI | SCSI over i-PCI |
| 192.168.0.4 | 192.168.0.57 | iSCSI HyperSCSI | Hyper SCSI |
| 192.168.0.4 | 74.125.67.100 | iSCSI | iSCSI |
| 192.168.0.16 | 192.168.0.57 | iSCSI HyperSCSI | Hyper SCSI |
| 192.168.0.16 | 74.125.67.100 | iSCSI | iSCSI |
| 207.46.232.182 | 192.168.0.57 | iSCSI | iSCSI |
| 207.46.232.182 | 74.125.67.100 | iSCSI | iSCSI |

FIG. 3

| HOST ID (IP Address) | STORAGE AVAILABLE TO THE HOST | | |
|---|---|---|---|
| | IP ADDRESS OF STORAGE RESOURCE | POSSIBLE PROTOCOLS TO ACCESS STORAGE RESOURCE | SELECTED OPTIMAL PROTOCOL TO ACCESS STORAGE RESOURCE |
| 192.168.0.4 | 192.168.0.4 | SCSI over i-PCI HyperSCSI | SCSI over i-PCI |
| 192.168.0.4 | 192.168.0.57 | iSCSI HyperSCSI | Hyper SCSI |
| 192.168.0.4 | 74.125.67.100 | iSCSI | iSCSI |

FIG. 5

```
Intialize: HostIPAddress, StorageIPAddress, Possible1, Possible2, Select, Pairing
READ HostIPAddress, StorageIPAddress
IF HostIPAddress == StorageIPAddress THEN
        Possible1 = "SCSI over i-PCI"
        Possble2 = "HyperSCSI"
        Select = "SCSI over i-PCI"
ELSE IF (HostIPAddress & 255.255.255.0) == (StorageIPAddress & 255.255.255.0)
        Possible1 = "iSCSI"
        Possible2 = "HyperSCSI"
        Select = "HyperSCSI"
ELSE
        Possible1 = "iSCSI"
END IF
Pairing [3] = {HostIPAddress, StorageIPAddress, Select}
```

FIG. 7

| State | Description |
|---|---|
| 0 | Boot Up: Host boots up or resets/reboots and performs built-in self test and saves results for diagnostic purposes. Ethernet auto-negotiation completes. |
| 1 | Probe: DSCP probes the network, via a broadcast on the LAN, to determine if there are any other Hosts already acting as a DSCP server. |
| 2 | Un-initialized DSCP Server Mode: System Data Transfer Optimization Utility runs based on pre-configured settings. Mappings of network topology are stored. |
| 3 | Un-initialized DSCP Client Mode: Obtain Mappings of network storage resources from DSCP Server. |
| 4 | Initialized DSCP Server Mode: Ready for normal operation based on defaults. |
| 5 | Initialized DSCP Client Mode: Ready for normal operation based on defaults. |
| 6 | DSCP Server Mode Admin Override: Administrator optionally adjust default configuration. |
| 7 | DSCP Client Mode Override: Administrator optionally adjust default configuration. |
| 8 | DSCP Client Normal Operation: Host utilizes optimal storage virtualization protocol on a "per remote resource" basis. |
| 9 | DSCP Server Normal Operation: Host utilizes optimal storage virtualization protocol on a "per remote resource" basis and responds to client probes. |

AUTO-DETECTION AND SELECTION OF AN OPTIMAL STORAGE VIRTUALIZATION PROTOCOL

CLAIM OF PRIORITY

This application claims priority of U.S. Provisional Patent Application Ser. No. 61/203,619 entitled "HOST BUS ADAPTER AUTO-DETECTION AND SELECTION OF AN OPTIMAL STORAGE VIRTUALIZATION PROTOCOL" filed Dec. 24, 2008, the teachings of which are incorporated herein by reference.

FIELD OF THE INVENTION

The present invention relates to virtualization of computer resources via high speed data networking protocols.

BACKGROUND OF THE INVENTION

Virtualization and iSCSI

There are two main categories of virtualization: 1) Computing Machine Virtualization 2) Resource Virtualization.

Computing machine virtualization involves definition and virtualization of multiple operating system (OS) instances and application stacks into partitions within a host system. Resource virtualization refers to the abstraction of computer peripheral functions. There are two main types of Resource virtualization: 1) Memory-Mapped I/O Virtualization 2) Storage Virtualization.

Examples of Memory-Mapped I/O Virtualization are those offered by PCI Express, or i-PCI as described in commonly assigned U.S. patent application Ser. No. 12/148,712, the teachings of which are incorporated herein by reference. Storage virtualization involves the abstraction and aggregation of multiple physical storage components into logical storage pools that can then be allocated as needed to computing machines. Storage virtualization falls into two categories: 1) File-level Virtualization 2) Block-level Virtualization.

In file-level virtualization, high-level file-based access is implemented. Network-attached Storage (NAS) using file-based protocols such as SMB and NFS is the prominent example.

In block-level virtualization, low-level data block access is implemented. In block-level virtualization, the storage devices appear to the computing machine as if it were locally attached. Storage Attached Network (SAN) is an example of this technical approach. SAN solutions that use block-based protocols include HyperSCSI (SCSI over Ethernet) and iSCSI (SCSI over TCP/IP).

Automatic Configuration Protocols:

Automatic Configuration Protocols are part of the current art. There have been several automatic configuration protocols introduced over recent years, typically as a lower-level protocol that is part of a higher standard. These include:

Universal Serial Bus (USB) with its ability to automatically detect and configure devices via a "surprise" attach/detach event.

PCI and PCI Express, with its non-surprise or signaled "hot plug" insertion/removal capability.

Bootp, as a part of UDP, used as a means for a client to automatically have its IP address assigned.

Reverse Address Resolution Protocol (RARP), part of TCP/IP, used as a means for a host system to obtain its IP or network address based on its Ethernet or data link layer address.

Address Resolution Protocol (ARP), part of TCP/IP, used as a protocol by which a host may determine another host's Ethernet or data link layer address based on the IP or network address it has for the host.

Dynamic Host Configuration Protocol (DHCP), as part of TCP/IP, which allows network devices to be added through automating the assignment of various IP parameters, including IP addresses.

In the current state of the art, there are multiple storage virtualization standards. In order to make the best choice among the standards for a given application, the user has to inspect the network topology, note the physical location of the targeted storage devices relative to the host, and understand the possible protocols that could be used to virtualize the storage resources to achieve the best performance (i.e. highest data rate, lowest latency). The level of expertise and the time required to complete a study of the network to achieve the best data transfers is too time consuming. As a result, most users must rely on networking experts or simply default their configuration to a single storage virtualization protocol—which typically is not ideal for all their networked storage devices.

SUMMARY OF THE INVENTION

The present invention achieves technical advantages as a new means for automatic detection and selection of an optimal network storage virtualization protocol. The invention is a solution for the problem of complexity and the resulting lack of optimization in storage virtualization implementations. The invention shields the user from the complexity of network analysis and allows the engaging of multiple storage virtualization protocols—as opposed to a single protocol. The invention enables automatic detection and selection of an optimal network storage virtualization protocol on a per resource basis, which is a unique capability and something that has not been accomplished in the prior art. The net result is a simplified user experience and optimized performance when using virtualized storage.

BRIEF DESCRIPTION OF THE DRAWINGS

FIG. 2 shows the Storage Associations established and maintained in table format on the DSCP server.

FIG. 3 shows the construction of the Protocol Pairings table, a version of which is stored on each client system.

FIG. 5 details the pseudo-code for the pairing algorithm.

FIG. 7 summarizes the state descriptions associated with the various DSCP states.

DETAILED DESCRIPTION OF THE PRESENT INVENTION

One aspect of the invention is a means for automatic detection and selection of an optimal network storage virtualization protocol. The invention advantageously includes a new protocol designated "Dynamic Storage Configuration Protocol" (DSCP). DSCP is applicable for use in extended system network applications where multiple network storage virtualization protocols are implemented including, but not limited to iSCSI, HyperSCSI, and "SCSI over i-PCI".

Figure 1:
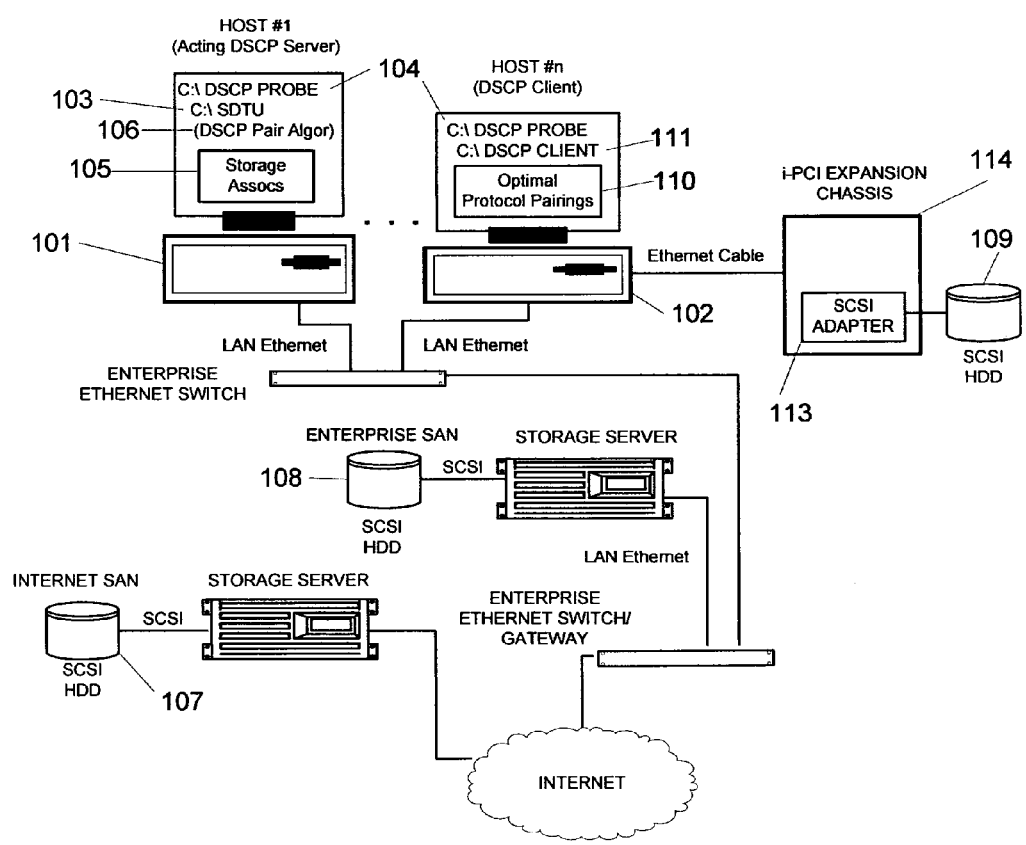
FIG. 1 is an illustration of a complete basic functionality Dynamic Storage Configuration Protocol (DSCP) network environment.

For reference, i-PCI is fully described in commonly assigned U.S. patent application Ser. No. 12/148,712, the teachings of which are incorporated herein by reference. Referring to FIG. 1, i-PCI may be applied to include SCSI simply though the use of a standard SCSI adapter card [113] installed in a PCI or PCI Express-based expansion chassis [114]. Thus it may be designated "SCSI over i-PCI".

The new protocol described in this application, DSCP, enables automatic detection and selection of an optimal network storage virtualization protocol on a per resource basis, based on various factors, including the network topology, location of the storage devices in relation to the topology, and the available storage virtualization protocols.

Referring to FIG. 1, according to one preferred embodiment of the invention, DSCP consists of the following components and functions:

DSCP Server: DSCP includes both server and client roles. A given host may act as a DSCP server [101] or client [102]. If there is no DSCP server on a network at the time a host is added to a network, it by default becomes the DSCP server. In one preferred embodiment, the DSCP server function is installed on the server that is also managing the general network parameter assignments via a protocol such as DHCP. Thus, the same server also determines and configures the network storage virtualization protocols. If a host is set as a DSCP server, first time configuration is accomplished via a System Data Transfer Utility (SDTU) [103].

DSCP Probe Function: DSCP Probe [104] is a simple network access utility that is engaged as part of the host boot-up sequence. DSCP Probe sends out a broadcast on the LAN to determine if there are any other hosts already acting as a DSCP server. If there is no response, it is assumed the host must also function as a DSCP server and hands off execution to the System Data Transfer Utility [103].

System Data Transfer Utility (SDTU): The SDTU [103] is an installed software that is optionally engaged as part of the host boot-up sequence. If no DSCP server is present on a network at the time a host is added to the network, that host, by default, assumes the DSCP server role. A "No DSCP Server" found message is communicated to the user and the System Data Transfer Utility is engaged to interact with the user. The SDTU creates a complete mapping table, referred to as the Storage Associations [105] of all network host and storage pairings. Storage may be available at various locations on a network, including but not limited to Internet Storage Area Network (SAN) [107], Enterprise SAN [108], SCSI over i-PCI storage [109]. The SDTU may use pre-configured default pairings as defined by the DSCP Pairings Algorithm [106] or it optionally may allow administrator interaction or over-rides to achieve network or system configuration and optimization goals. Once the SDTU has been run, the host is then rebooted and the host then becomes the active DSCP server. The DSCP server then responds to probes from any other host system [102] on the network. Any other hosts subsequently added to the system would then discover the DSCP server when they execute their Probe Function [104] and thus would configure themselves as a client.

Storage Associations [105]: Associations between host and virtualized storage are established such that virtualization protocols may be engaged that are optimal. Multiple protocols may be engaged with one protocol associated with a storage resource and another protocol associated with another storage resource such that optimal data transfer is achieved for each host-to-resource pairing. FIG. 2 shows the construction of a table for the Storage Associations.

DSCP Client: DSCP is executed as a precursor to session management. A host system [102], executing DSCP as a client [111], determines the optimal virtualization protocol to use for data storage, based on the network topology settings stored in "Storage Associations" [105] located on the DSCP Server. The Storage Association on the DSCP Server is accessed by the DSCP client [111] and the optimal protocol is configured for each storage device it is mapped to on the network. The locally stored configuration is referred to as the Optimal Protocol Pairings [110]. FIG. 3 shows the construction of the Protocol Pairings, which is simply a downloaded current subset of the Storage Associations found on the DSCP Server.

Figure 4:
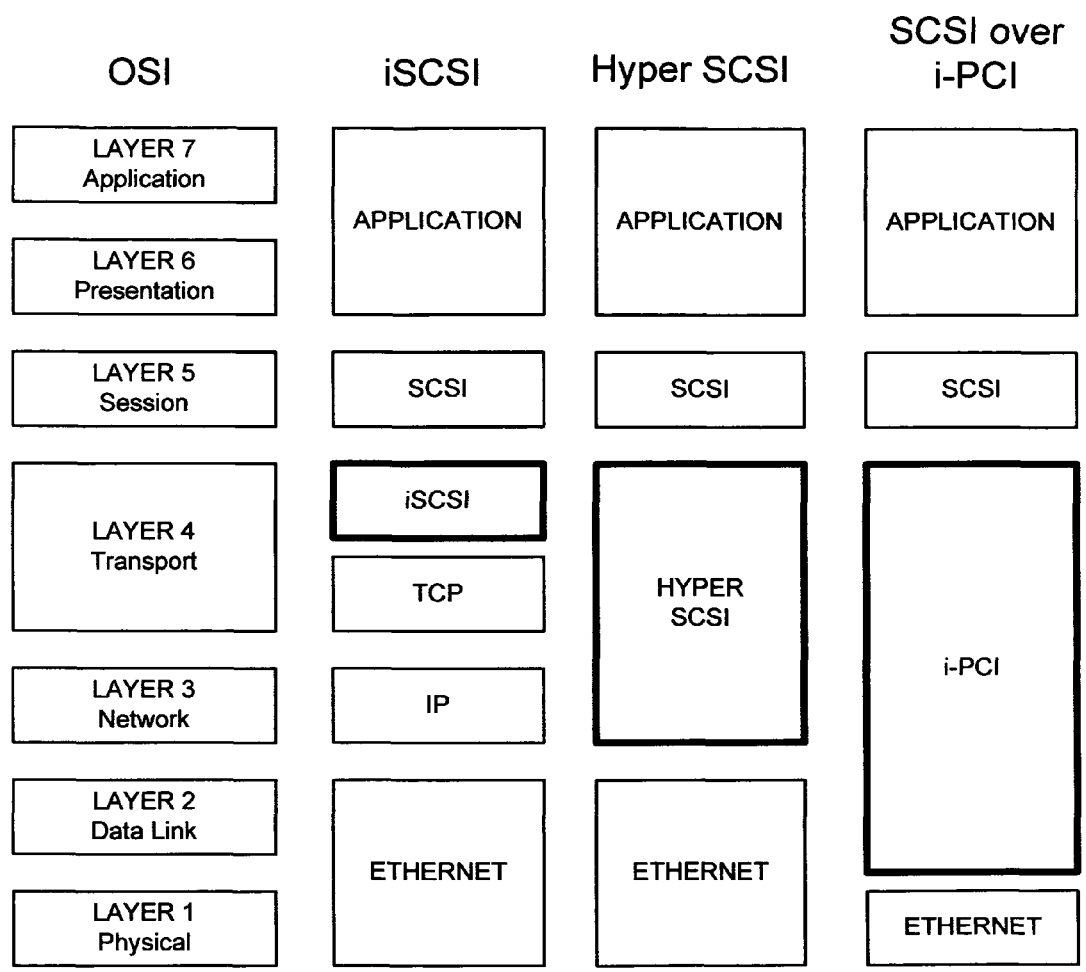
FIG. 4 shows the relationship of the various storage protocols to the OSI layers.

DSCP Pairings Algorithm [106]: The DSCP pairings algorithm executes as a function within the SDTU software. The algorithm is based on a simple performance rule: To maximize performance, the protocol operating at the lowest OSI layer is selected. FIG. 4 shows the relationship of the various storage protocols to the OSI layers. Referring to FIG. 4, for example, if there is a direct connect via i-PCI to an expansion chassis that includes a SCSI adapter and hard drives [109], it is selected over HyperSCSI. In another example, an iSCSI server and SAN [108] located on a peer port of the same Ethernet switch would be connected to via HyperSCSI, rather than iSCSI. FIG. 5 details the simplified pseudo-code for the pairing algorithm for a single entry as a means of illustrating the concept.

Figure 6:
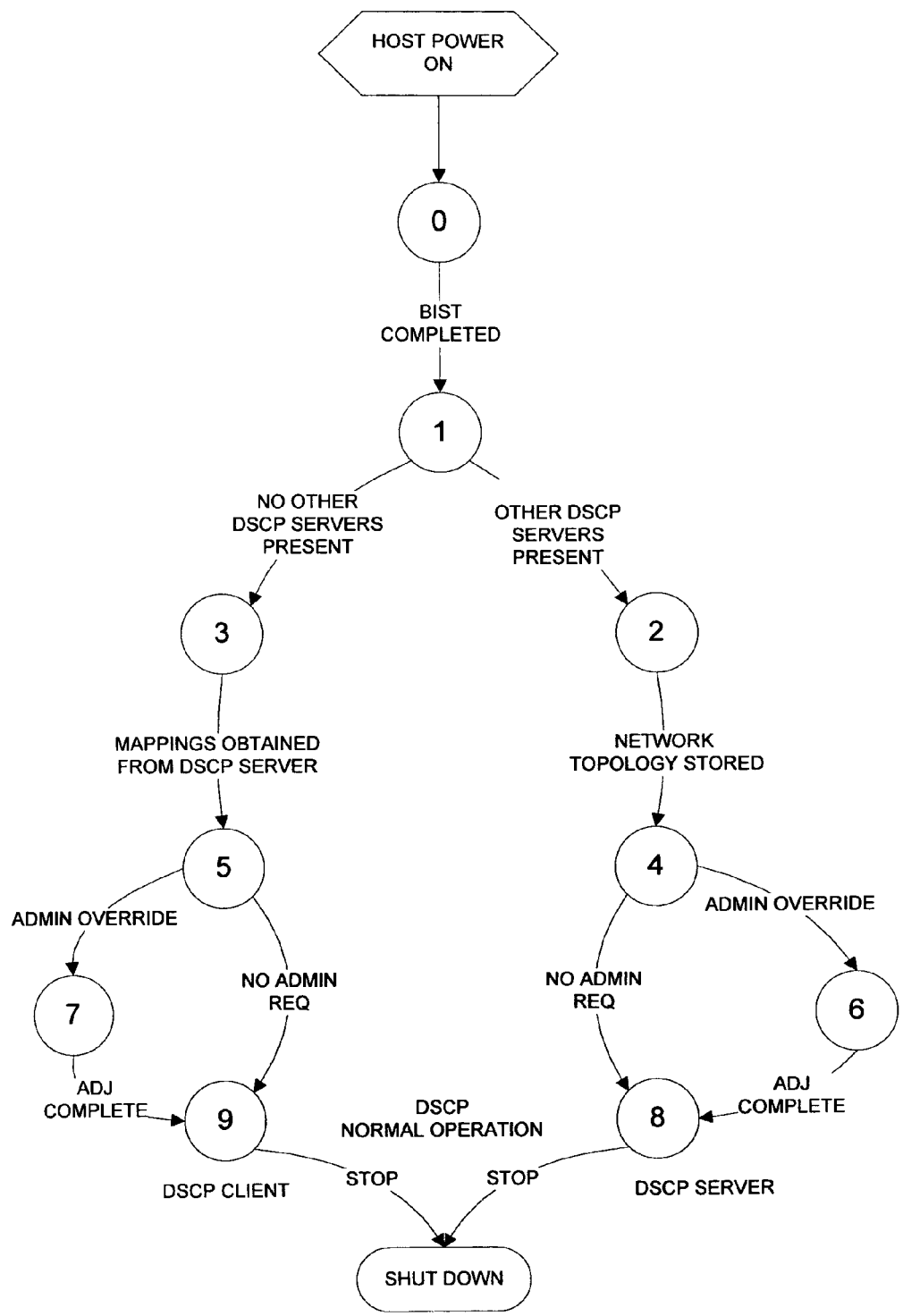
FIG. 6, shows a basic functionality DSCP state machine for both client and server.

Referring to FIG. 6, a basic functionality DSCP state machine for both client and server is shown.

FIG. 7 summarizes the state descriptions associated with the various DSCP states illustrated in FIG. 6.

Throughout this application the virtualization of SCSI as a base storage protocol is used to illustrate the concept of the invention. However, it is not intended to exclude other storage virtualization protocols. Rather, other present and emerging storage protocols may readily be included in the network topology and the pairing algorithm modified to be inclusive of these protocols.

Although the invention has been described with respect to specific preferred embodiment, many variations and modifications will become apparent to those skilled in the art upon reading the present application. It is therefore the intention that the claims be interpreted as broadly as possible in view of the prior art to include such variations and modifications.

What is claimed is:

1. A method for detecting, associating, and establishing an optimal storage virtualization protocol between a host system and a given virtualized storage device on a network, comprising:

enabling a host system for network connectivity and analysis, where the host system is automatically configured as a protocol client or as both a protocol server and a protocol client, depending on a presence or absence of an existing protocol server;

enabling a utility configured to execute a network probing algorithm on a network; and enabling a software configuration function responsive to the utility and configured to assign one of a plurality of storage virtualization protocols as an optimal storage virtualization protocol for subsequent data transactions between the host system and a virtualized storage device, wherein the assigned storage virtualization protocol is assigned as a function of an OSI layer associated with the plurality of storage virtualization protocols, where the plurality of storage virtualization protocols include iSCSI, HyperSCSI, and SCSI over i-PCI, wherein when there is a direct connect via i-PCI to an expansion chassis on the network that includes a SCSI adapter and a hard drive, the host system is configured to utilize the direct connect rather than HyperSCSI.

2. The method as specified in claim 1 wherein the utility is a software utility.

3. The method as specified in claim 1 wherein the utility is a firmware utility.

4. The method as specified in claim 1 wherein the utility is a logic utility.

5. The method as specified in claim 1 wherein the utility is configured to be engaged as part of a host boot-up sequence.

6. The method as specified in claim 1 wherein the utility is configured to send out a broadcast on a LAN to determine if there are any other hosts already acting as a server.

7. The method as specified in claim 6 wherein if there is no response to the broadcast, the host system operates as the server and hands off execution to a system data transfer utility.

8. The method as specified in claim 7 wherein the system data transfer utility is configured to create a mapping table of all network host and storage pairings.

9. The method as specified in claim 7 wherein the system data transfer utility may use pre-configured default pairings as defined by a pairing algorithm, or optionally may allow administrator interaction or over-rides to achieve network or system configuration and optimization goals.

10. The method as specified in claim 1 wherein the host system is configurable to operate as both a server and a client.

11. The method as specified in claim 10 wherein if the host system is configured as a client, the host system is configured to execute as a precursor to session management.

12. The method as specified in claim 11 wherein the host system is configured as a client, and the host system is configured to determine the optimal virtualization protocol to use for data storage based on network topology settings stored in a server.

13. The method as specified in claim 12 wherein the network topology settings are configured to map the optimal protocol for each storage device mapped on the network.

14. The method as specified in claim 1 wherein the host system is configured such that if no other host is detected on the network at the time the host is added to a network, the host is configured to becomes a server.

15. The method as specified in claim 1 wherein the host system is configured on a server that is also configured to manage general network parameter assignments via a protocol.

16. The method as specified in claim 1 wherein the assigned storage virtualization protocol has the lowest associated OSI layer.

* * * * *